United States Patent
Huang et al.

(10) Patent No.: US 10,715,990 B2
(45) Date of Patent: Jul. 14, 2020

(54) INFORMATION PROCESSING METHOD AND COMMUNICATION NODE

(71) Applicant: ZTE Corporation, Shenzhen (CN)

(72) Inventors: Ying Huang, Shenzhen (CN); Lin Chen, Shenzhen (CN)

(73) Assignee: XI'AN ZHONGXING NEW SOFTWARE CO., LTD., Shaanxi (CN)

(*) Notice: Subject to any disclaimer, the term of this patent is extended or adjusted under 35 U.S.C. 154(b) by 45 days.

(21) Appl. No.: 15/573,908

(22) PCT Filed: May 13, 2016

(86) PCT No.: PCT/CN2016/082078
§ 371 (c)(1),
(2) Date: Nov. 14, 2017

(87) PCT Pub. No.: WO2016/180367
PCT Pub. Date: Nov. 17, 2016

(65) Prior Publication Data
US 2018/0352412 A1    Dec. 6, 2018

(30) Foreign Application Priority Data

May 14, 2015  (CN) .......................... 2015 1 0246242

(51) Int. Cl.
*H04W 8/00*     (2009.01)
*H04W 76/20*   (2018.01)
(Continued)

(52) U.S. Cl.
CPC .............. *H04W 8/005* (2013.01); *H04W 4/90* (2018.02); *H04W 24/10* (2013.01); *H04W 36/00* (2013.01);
(Continued)

(58) Field of Classification Search
CPC ..... H04W 8/005; H04W 76/20; H04W 76/30; H04W 76/23; H04W 76/14; H04W 24/10;
(Continued)

(56) References Cited

U.S. PATENT DOCUMENTS 10,412,571 B2 *  9/2019  Baghel .................. H04W 24/10
2015/0230114 A1 *  8/2015  Delsol ............... H04W 36/0094
                                                                    370/252
(Continued)

FOREIGN PATENT DOCUMENTS

CN    102215537 A    10/2011
CN    103179575 A    6/2013
(Continued)

OTHER PUBLICATIONS

NEC, "E-UTRAN based discovery of ProSe Relays", Jul. 19, 2013, SA WG2 Meeting 52#98 S2-132559. (Year: 2013).*
(Continued)

*Primary Examiner* — Christopher R Crompton
(74) *Attorney, Agent, or Firm* — Cantor Colburn LLP

(57) ABSTRACT

An information processing method, applied to a first Device-to-Device (D2D) User Equipment (UE), is provided. In the method, auxiliary information is received from a first access node of the first D2D UE; and a second access node is accessed according to the auxiliary information, where the first access node and the second access node are access nodes of different types.

14 Claims, 6 Drawing Sheets

(51) Int. Cl.
*H04W 36/00* (2009.01)
*H04W 4/90* (2018.01)
*H04W 76/14* (2018.01)
*H04W 76/23* (2018.01)
*H04W 36/30* (2009.01)
*H04W 36/32* (2009.01)
*H04W 76/30* (2018.01)
*H04W 24/10* (2009.01)
*H04W 88/04* (2009.01)

(52) U.S. Cl.
CPC ... *H04W 36/0005* (2013.01); *H04W 36/0055* (2013.01); *H04W 36/0094* (2013.01); *H04W 36/30* (2013.01); *H04W 36/32* (2013.01); *H04W 76/14* (2018.02); *H04W 76/20* (2018.02); *H04W 76/23* (2018.02); *H04W 76/30* (2018.02); *H04W 36/03* (2018.08); *H04W 88/04* (2013.01)

(58) Field of Classification Search
CPC ............. H04W 36/00; H04W 36/0005; H04W 36/0055; H04W 36/0094; H04W 36/30; H04W 36/32; H04W 36/03; H04W 88/04
USPC ........................................................ 370/252
See application file for complete search history.

(56) References Cited

U.S. PATENT DOCUMENTS

| | | | |
|---|---|---|---|
| 2015/0382277 A1* | 12/2015 | Ljung | H04W 76/14 455/445 |
| 2016/0234806 A1* | 8/2016 | Le Thierry D'Ennequin | H04W 72/005 |
| 2018/0049016 A1* | 2/2018 | Adachi | H04W 92/18 |
| 2018/0049260 A1* | 2/2018 | Aminaka | H04W 72/048 |
| 2018/0123682 A1* | 5/2018 | Jung | H04W 40/12 |

FOREIGN PATENT DOCUMENTS

| | | |
|---|---|---|
| WO | 2015004142 A1 | 1/2015 |
| WO | 2015052548 A1 | 4/2015 |
| WO | 2014050886 A1 | 8/2016 |

OTHER PUBLICATIONS

International Search Report for corresponding application PCT/CN2016/082078 filed on May 13, 2016; Report dated Jul. 26, 2016.
LG Electronics: Solution on ProSe Relay Selection and Re-selection:, 3GPP Draft; S2-134143_S2_100_Prose_Relay Reslection_V4, 3rd Generation Partnership Project (3GPP), Nov. 12, 2013, vol. SA WG2, No. San Francisco, USA; Nov. 11, 2013-Nov. 15, 2013.
NEC "E-Utran based discovery of ProSe Relays", 3GPP SAWG2 Meeting S2#98 S2-132559, Jul. 15-19, 2013, pp. 1-4.
NEC: "ProSe Relay discovery assisted by E-UTRAN", 3GPP Draft; S2-133376 Prose Relay, Vo-2, 3rd Generation Partnership Project (3GPP), Sep. 18, 2013, vol. SA WG2, No. Xiamen, Sep. 23, 2013-Sep. 27, 2013, XP050726730.
Supplemental European Search Report dated May 3, 2018, re: Application No. 16792217.8-1214 / 3297328, pp. 1-11, citing: WO 2015/052548 A1, WO 2015/004142 A1, WO 2014/050886 A1, NEC, LG Electronics.

* cited by examiner

INFORMATION PROCESSING METHOD AND COMMUNICATION NODE

TECHNICAL FIELD

The present disclosure relates to, but is not limited to, the field of communications, and more particularly to an information processing method and a communication node.

BACKGROUND

With the development of wireless multimedia services, demands of people for high data rate and user experience are increasing, so as to raise higher requirements for system capacity and coverage of a traditional cellular network. In addition, the popularization of applications such as social networking, near field data sharing and local advertising may enable demands of people, for knowing about people or things of interest nearby and communicating therewith, to gradually increase. A related cell-based cellular network has obvious limitations to high data rate and supporting of proximity services. Under this demand background, a Device-to-Device (D2D) technology representative of a new development direction of future communication technologies emerges. Application of the D2D technology may alleviate burdens on the cellular network, reduce the power consumption of a battery of User Equipment (UE), increase the data rate, improve the robustness of network infrastructure, and well meet requirements for the foregoing high data rate services and proximity services.

The D2D technology may work at a licensed band or an unlicensed band. The D2D technology may allow multiple pieces of UE (i.e., D2D UE) supporting a D2D function to perform direct discovery/direct communication in the presence of network infrastructure or in the absence of network infrastructure. There are mainly three D2D application scenarios as follows:

1) UE1 and UE2 may perform data interaction under the coverage of a cellular network, and user plane data does not pass through network infrastructure, as shown in Mode 1 in FIG. 1.

2) UE in a weakly covering/coverless area may perform relayed transmission, as shown in Mode 2 in FIG. 1. For example, UE4 with poor signal quality may be allowed to communicate with a network via proximal UE3 covered by the network. This mode is beneficial for coverage expansion and capacity improvement of an operator.

3) When an earthquake or an emergency occurs and a cellular network cannot normally work, inter-device direct communication may be allowed, as shown in Mode 3 in FIG. 1. For example, one-hop or multi-hop data communication may be performed over control planes and user planes among UE5, UE6 and UE7 without network infrastructure.

The D2D technology may include a D2D discovery technology and a D2D communication technology.

1) The D2D discovery technology refers to a technology for judging/determining whether two or more pieces of D2D UE are proximal to each other (e.g., within a range capable of performing D2D direct communication) or judging/determining whether a first UE is proximal to a second UE.

2) The D2D communication technology refers to a technology for direct communication of some or all communication data between pieces of D2D UE without network infrastructures.

In application scenarios as shown in FIG. 2 and FIG. 3, D2D UE may serve as a relay node, such that remote D2D UE at the coverage edge of a cellular network or out of coverage may perform cellular communication with a network through the relay node UE, and D2D UEs may perform D2D communication between each other through the relay node UE. The D2D UE may move at a coverage edge of a cell, and in this case, the D2D UE may need to switch (i.e., change) the access node of the D2D UE to access the network. For example, after moving into cell coverage, a D2D UE relayed by a relay UE may access the network through a base station (which may be embodied as an evolved Node B (eNB)). After moving out of cell coverage, a UE which accesses the network through a base station within the cell coverage may access the network through a relay UE. However, a method for switching an access node of D2D UE is not provided, thus influencing the continuity of communication services of UE at the coverage edge of a cell.

SUMMARY

The following is a brief introduction for a subject matter described herein in detail. The brief introduction is not intended to restrict the scope of protection of claims.

Some embodiments of the prevent disclosure provide an information processing method and a communication node, which may at least solve a problem of switching of an access node of a D2D UE.

According to a first embodiment of the present disclosure, an information processing method is provided. The method may be applied to a first D2D UE. The method may include the following acts.

Auxiliary information may be received from a first access node of the first D2D UE.

A second access node may be accessed according to the auxiliary information.

In the embodiment, the first access node and the second access node may be access nodes of different types.

According to a second embodiment of the present disclosure, an information processing method is provided. The method may be applied to a first access node of a first D2D UE. The method may include the following acts.

Auxiliary information may be formed. In the embodiment, the auxiliary information may be used for access of the first D2D UE to a second access node, and the first access node and the second access node may be access nodes of different types.

The auxiliary information may be sent to the first D2D UE.

In an optional embodiment, the second access node may be a first base station, and the first access node may be a relay node located in a first cell or a second cell, where the first cell may be a cell subordinate to the first base station, the second cell may be a neighbor cell of the first cell, and the relay node may be a second D2D UE.

According to a third embodiment of the present disclosure, a communication node is provided. The communication node may be a first D2D UE. The communication node may include: a first receiving unit and an access unit.

The first receiving unit may be configured to receive auxiliary information from a first access node of the first D2D UE.

The access unit may be configured to access a second access node according to the auxiliary information.

In the embodiment, the first access node and the second access node may be access nodes of different types.

In an optional embodiment, the second access node may be a first base station, and the first access node may be a relay node located in a first cell or a second cell, where the first cell may be a cell subordinate to the first base station, the second cell may be a neighbor cell of the first cell, and the relay node may be a second D2D UE.

According to a fourth embodiment of the present disclosure, a communication node is provided. The communication node may be a first access node of a first D2D UE. The communication node may include: a first forming unit and a second sending unit.

The first forming unit may be configured to form auxiliary information. In the embodiment, the auxiliary information may be used for access of the first D2D UE to a second access node, and the first access node and the second access node may be access nodes of different types.

The second sending unit may be configured to send the auxiliary information to the first D2D UE.

Another embodiment of the present disclosure provides a computer-readable storage medium in which a computer-executable instruction is stored. When the computer-executable instruction is executed, the information processing method applied to the first D2D UE may be implemented.

Still another embodiment of the present disclosure provides a computer-readable storage medium in which a computer-executable instruction is stored. When the computer-executable instruction is executed, the information processing method applied to the first access node of the first D2D UE may be implemented.

According to the information processing method and the communication node in some embodiments of the present disclosure, auxiliary information which can be used for switching an access node may be acquired from a currently-connected first access node, and a second access node may be accessed according to the auxiliary information. Thus, an ignored problem of node switching or supplementation of a D2D UE may be solved, and meanwhile, a problem of communication interruption or poor communication quality caused by delayed node switching of the D2D UE may also be solved.

After the drawings and the detailed descriptions are read and understood, other aspects of the disclosure may be understood.

DETAILED DESCRIPTION OF THE EMBODIMENTS

The technical solutions of the present application will be elaborated hereinbelow with the drawings of the specification and exemplary embodiments.

First Method Embodiment

Figure 4:
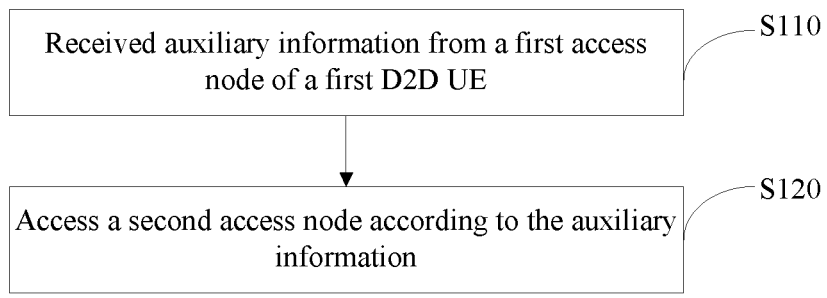
FIG. 4 is a first flowchart of an information processing method according to an embodiment of the present disclosure.

As shown in FIG. 4, the present embodiment provides an information processing method. The method may be applied to a first D2D UE. The method may include the acts as follows.

At act S110, auxiliary information may be received from a first access node of the first D2D UE.

At act S120, a second access node may be accessed according to the auxiliary information.

The first access node and the second access node may be access nodes of different types.

In the present embodiment, the access node may be a base station or a relay node, and the relay node may be a D2D node. The D2D node may be communication equipment capable of performing direct communication between terminal equipment and terminal equipment.

In the present embodiment, the first access node and the second access node may be embodied in at least the following two manners.

First Manner

The second access node may be a first base station, and the first access node may be a relay node located in a first cell or a second cell, where the first cell may be a cell subordinate to the first base station, the second cell may be a neighbor cell of the first cell, and the relay node may be a second D2D UE. Usually, under this situation, the first D2D UE is approaching the first base station, and may be directly connected with the first base station for communication.

Second Manner

The first access node may be a first base station, and the second access node may be a relay node located in a first cell, where the first cell may be a cell subordinate to the first base station, and the relay node may be a second D2D UE. Usually, under this situation, the first D2D UE starts to move out of a coverage range of the first base station. In order to continuously maintain communication with the first base station, the first D2D UE may need to be located within the coverage range of the first base station. In this case, the second D2D UE located at the edge location of the first cell may serve as a relay for the first D2D UE.

Figure 2:
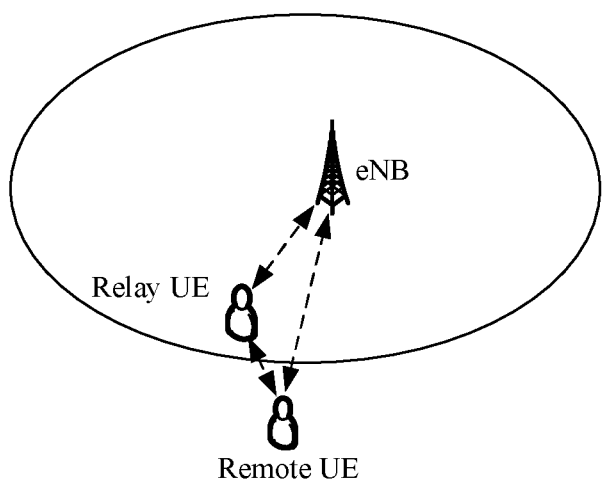
FIG. 2 is a second scenario diagram of D2D communications.
Figure 3:
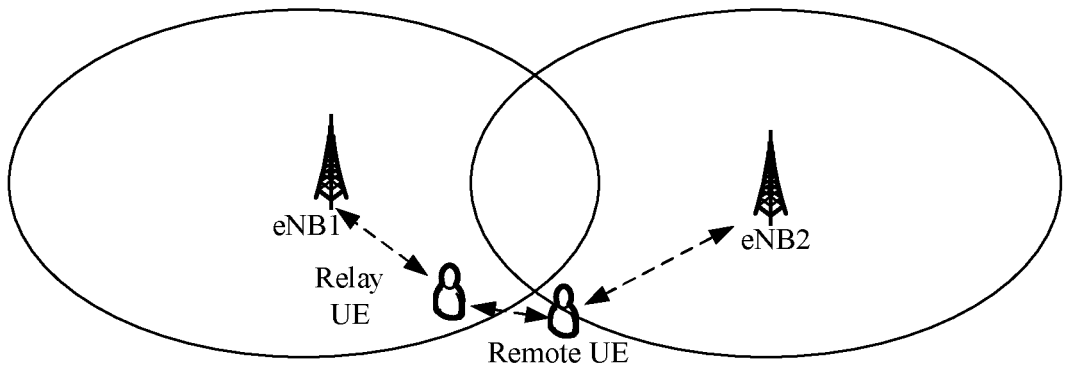
FIG. 3 is a third scenario diagram of D2D communications.

The first D2D UE may be a remote UE in FIG. 2 or FIG. 3. The second D2D UE in the present embodiment may be a relay UE in FIG. 2 or FIG. 3.

In the First Manner

The act S110 may include:
the first D2D UE may receive the auxiliary information from the relay node, where the auxiliary information may include at least one of: cell information of the first cell and/or the neighbor cell of the first cell, and dedicated random access resource information.

The dedicated random access resource information may include at least one of: random access preamble information, physical layer random access time domain resource information and physical layer random access frequency domain resource information. These pieces of information may be used for the first D2D UE to send a random access request to the first base station, so as to set up a connection with the first base station, in order to switch to the first base station for communication data transmission.

The cell information may include at least one of: a frequency point, a cell identifier, a cell access barring indicator, and a cell access probability parameter.

Herein, the cell access barring indicator may be used to indicate that the first D2D UE is barred from accessing a corresponding cell, and the cell access probability parameter may be used to control a quantity of UEs accessing a corresponding cell.

The auxiliary information may further include a cell detection trigger threshold value.

The cell detection trigger threshold value is a threshold value for measurement, performed by the first D2D UE, over a signal sent by the relay node, and may be used for triggering, when a measurement value obtained by measuring the signal sent by the relay node by the first D2D UE is smaller than the cell detection trigger threshold value, the first D2D UE to start cell detection to search for a cell allowing access of the first D2D UE. The cell here is a general term of cells formed by base stations of all types, including the first cell and the second cell. Here, searching for a cell allowing access of the first D2D UE may be equivalent to searching for a base station available for access of the first D2D UE. If the base station available for access of the first D2D UE is found, the base station is the second access node in the present manner. In this case, the auxiliary information may be sent by the relay node at act S110. The relay node may send the auxiliary information in a broadcast or unicast manner, so that the first D2D UE may receive the auxiliary information from a broadcast signal or a unicast signal.

During implementation, the first D2D UE may also send an auxiliary information acquisition request to the relay node according to a current communication demand or conversion of a current communication scenario. At act S110, the auxiliary information returned by the relay node in response to the auxiliary information acquisition request may be received by the first D2D UE. For example, the first D2D UE may discover that the signal quality of a received signal sent by the base station is good at this time by measuring the signal quality of the signal sent by the base station at a current location, and trigger conditions of sending the auxiliary information acquisition request may be satisfied, so the first D2D UE may send the auxiliary information acquisition request to the relay node at this time. Usually at this time, the relay node may send, in a unicast manner, the auxiliary information to the first D2D UE sending the auxiliary information acquisition request to the relay node.

When the relay node sends the auxiliary information in a broadcast manner, the first D2D UE connected with the relay node may periodically receive the auxiliary information. Alternatively, when the location offset of the relay node satisfies predetermined conditions, the first D2D UE may receive the auxiliary information automatically pushed by the relay node. The relay node may actively send the auxiliary information in a unicast manner. For example, the relay node may perform detection to discover that each first D2D UE may transmit communication data through a first base station, so the auxiliary information may be actively pushed to the first D2D UE. At this time, the first D2D UE may obtain, from the relay node, the auxiliary information which is actively pushed by the relay node and sent in a unicast manner.

The frequency point may be frequency point information, available for communication, of the first cell or the second cell. The cell identifier may be information such as a cell number of the first cell or the second cell. The second cell may be a cell formed by the second base station and proximal to the first cell. The second base station may be a base station different from the first base station. For example, the first base station may be eNB2 in FIG. 3, and the second base station may be eNB1.

Usually, the cell access probability parameter may be a value between 0 and 1. During communication, the first D2D UE may generate a random number, and if the random number is smaller than the cell access probability parameter, the first D2D UE requests for accessing the first base station. Thus, the cell access probability parameter may achieve control over the quantity of UEs accessing the first base station by taking the first base station as an access node.

In the Second Manner

The act S110 may include: receiving the auxiliary information from the first base station. The auxiliary information may include node information of a relay node to which the first D2D UE is accessible. The relay node may be a second D2D UE.

The act S120 may include: accessing the relay node according to the auxiliary information.

The node information may include at least one of: a relay node identifier, D2D discovery resource information used by a D2D relay node, D2D communication resource information available for D2D communication between the first D2D UE and the relay node, and D2D communication bearer configuration information for D2D communication between the first D2D UE and the relay node. The D2D discovery resource information here may be resource information available for D2D discovery, may include information of a single D2D discovery resource, or may include information of a D2D discovery resource pool. The D2D communication resource information may be resource information available for D2D communication. The D2D communication resource information may include information of a single D2D communication resource, or may include information of a D2D communication resource pool.

In the Second Manner, the auxiliary information may include a relay node discovery trigger threshold value and/or measurement reporting configuration information. The relay node discovery trigger threshold value may be used for triggering the first D2D UE to discover a relay node available for access of the first D2D UE. The measurement reporting configuration information may be used for triggering the first D2D UE to measure the first cell and/or a second cell, and report a measurement result about the first cell and/or the second cell to the first base station, where the second cell may be a neighbor cell of the first cell.

The relay node discovery trigger threshold value may include a first threshold value.

The first threshold value may be a threshold value for measurement, performed by the first D2D UE, over the first cell.

Herein, the first threshold value may be used for triggering, when a measurement value obtained by measuring the first cell by the first D2D UE is smaller than the first threshold value, the first D2D UE to start relay node discovery to search for a relay node available for access of the first D2D UE.

Herein, the first threshold value may be at least one of a Reference Signal Received Power (RSRP) value and a Reference Signal Received Quality (RSRQ) value. The measurement value of the first cell here may be a measurement value of a signal sent by the first cell, such as a reference signal sent by the first cell.

The relay node discovery trigger threshold value may further include a second threshold value. The second threshold value may be a threshold value for measurement, performed by the first D2D UE, over a neighbor cell (i.e., second cell) of the first cell.

The second threshold value may be used for triggering, when a measurement value obtained by measuring the first cell by the first D2D UE is smaller than a first threshold value and a measurement value obtained by measuring the second cell by the first D2D UE is smaller than the second threshold value, the first D2D UE to start relay node discovery to search for a relay node available for access of the first D2D UE. The second threshold value may be an RSRP value and/or an RSRQ value.

Discovery of the D2D relay node may be implemented by means of a D2D discovery process.

When an access node of the first D2D UE includes a first access node and a second access node at the same time, or after the access node of the first D2D UE is switched from the first access node to the second access node, the first D2D UE may transmit communication data through the second access node.

So, on the basis of the foregoing solutions, the information processing method in the embodiment of the present application may further include the acts as follows.

At act S130, bearer control information may be received.

At act S140, communication data transmission may be performed after switching, according to the bearer control information, to the second access node.

The act S130 may be executed before the act S110, or may be executed after the act S110. No particular sequence is limited in the embodiments of the disclosure.

Usually, the bearer control information may be sent by a base station such as a first base station.

The bearer control information sent by the first base station may include at least two of the following information.

First, the bearer control information may include a bearer switch indicator. The bearer switch indicator may be used to indicate switch of the first D2D UE to the second access node for communication data transmission.

When the first base station is the first access node, the bearer control information may be received before the act S110 or may be received after the act S110. When the first base station is the second access node, the bearer control information may usually be received after the first D2D UE accesses the first base station.

The bearer switch indicator may be used to indicate switch of the first D2D UE to a first base station or a relay node for communication data transmission. At this time, the first base station may determine whether to allow the first D2D UE to access the first base station according to a load of the first base station or a current load of the relay node and a communication quality of a channel between the first base station and the first D2D UE after receiving a bearer switchover request. When determining to allow the first D2D UE to access the first base station, the first base station may send the bearer switch indicator to the first D2D UE, so that the first D2D UE may receive the bearer switch indicator. When determining not to allow the first D2D UE to access the first base station, the first D2D UE may directly receive a message indicative of failure of a bearer switch request from the first base station. So, in this manner, the first base station may be the one to determine whether to allow the first D2D UE to switch to the first base station for network access.

Second, the bearer control information may include bearer switchover judgment parameter information. The bearer switchover judgment parameter information may include at least one of a Radio Resource Management (RRM) measurement threshold value and a measurement threshold value of D2D communication. Under such a condition, the first D2D UE may measure a signal such as a reference signal sent by the first base station and perform judgment according to the measurement threshold value to determine whether the first D2D UE can switch to the second access node for communication data transmission. In this manner, whether the first D2D UE can switch to the second access node for communication data transmission is determined by the first D2D UE.

At this time, the act S140 may include: performing channel measurement based on a measurement signal sent by the first base station to form a first measurement result; determining whether the first D2D UE can switch to the second access node for communication data transmission according to the bearer switchover judgment parameter information and the first measurement result; and if it is determined that the first D2D UE can switch to the second access node for communication data transmission according to the bearer switchover judgment parameter information and the first measurement result, switching to the second access node.

Before switching, according to the bearer control information, to the second access node for communication data transmission, the method may further include:

sending bearer switchover judgment auxiliary information to the first base station.

The bearer switchover judgment auxiliary information in the present embodiment may be used for providing basis for forming the bearer control information by the first base station. For example, basis may be provided for the first base station to determine whether to send a bearer switchover indicator or a bearer switchover request failure to the first D2D UE, or, basis may be provided for the first base station to determine an RRM measurement threshold value and a measurement threshold value of D2D communication, in order that the first base station controls access of the first D2D UE.

The bearer switchover judgment auxiliary information may further include at least one of: UE to Network (UE to NW) relay indication information, a measurement report, and location information. The UE to NW relay indication information may be used to indicate that the first D2D UE currently performs data transmission through a UE to NW relay. The measurement report may contain an RRM measurement result obtained by measuring a current serving cell and/or neighbor cell by the first D2D UE. The location information may include current geographical location information of the first D2D UE. These pieces of information may assist the first base station in determination of contents of a response message. For example, when the current location of the first D2D UE is at the edge of a cell subordinate to the first base station, if the first D2D UE is directly switched to the first base station for communication data transmission, a problem of poor communication effect may be caused. Under such a condition, the first base station may form a response message of not allowing the first D2D UE to switch to the first base station to access a network according to the location information, or the foregoing RRM measurement threshold value may be improved.

If the first D2D UE needs to send a measurement report to the first base station, the method may further include the following acts. Before the first D2D UE sends a measurement report to the first base station, measurement reporting configuration information sent by the first base station may be received. Channel measurement may be performed according to the measurement reporting configuration information, so as to form a second measurement result. When the second measurement result satisfies a reporting condition, the second measurement report may be sent to the first base station.

The reporting condition, which the second measurement result satisfies, may include a condition that channel measurement discovers that a signal sent by the first base station reaches a signal intensity threshold value of the first D2D UE. It may be appreciated that the reporting condition is not limited to the example given here.

After the first D2D UE accesses the second access node, a connection with the first access node may be continuously maintained, or a connection with the first access node may be released. A release manner may include: after a connection release message is received from the first access node, releasing the connection with the first access node based on the connection release message, or after a connection release timer inside the first D2D UE expires, releasing the connection with the first access node.

The present embodiment provides a D2D UE. In a movement process, the method of switching an access node from a base station to a relay node or switching from the relay node to the base station due to movement may solve an ignored problem of communication interruption or poor communication quality or large delay caused by change of location information of the D2D UE.

Second Method Embodiment

Figure 5:
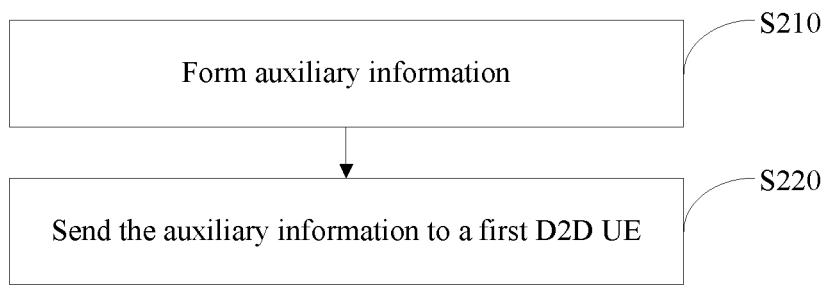
FIG. 5 is a second flowchart of an information processing method according to an embodiment of the present disclosure.

As shown in FIG. 5, the present embodiment provides an information processing method. The method may be applied to a first access node of a first D2D UE. The method may include the acts as follows.

At act S210, auxiliary information may be formed. The auxiliary information may be used for access of the first D2D UE to a second access node, and the first access node and the second access node may be access nodes of different types.

At act S220, the auxiliary information may be sent to the first D2D UE.

Figure 1:
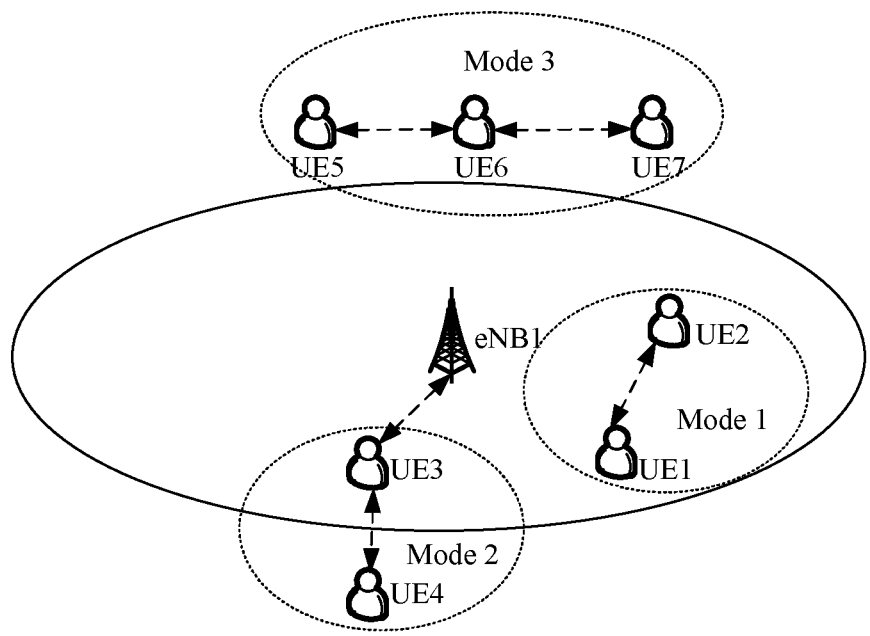
FIG. 1 is a first scenario diagram of D2D communications.

In the present embodiment, the first access node may be a base station, for example, an eNB in FIG. 1 to FIG. 3, or may be a D2D UE, for example, a relay UE in FIG. 1 to FIG. 3.

In the present embodiment, the first access node may form auxiliary information, and may send the auxiliary information to the first D2D UE, so as to make it convenient for the first D2D UE to determine whether to switch to the second access node for communication data transmission according to the auxiliary information. Thus, an ignored problem of deteriorated communication quality or poor communication quality caused by the mobility of the first D2D UE may be solved.

As an exemplary implementation, the second access node may be a first base station, and the first access node may be a relay node located in a first cell or a second cell. The first cell may be a cell subordinate to the first base station, the second cell may be a neighbor cell of the first cell, and the relay node may be a second D2D UE.

The second cell here may be a cell formed by a second base station and proximal to the first cell.

The auxiliary information may include at least one of: cell information of the first cell and/or the neighbor cell of the first cell, and dedicated random access resource information.

The cell information may include at least one of: a frequency point, a cell identifier, a cell access barring indicator, and a cell access probability parameter.

Herein, the cell access barring indicator may be used to indicate that the first D2D UE is barred from accessing a corresponding cell, and the cell access probability parameter may be used to control a quantity of UEs accessing a corresponding cell.

The dedicated random access resource information may refer to the foregoing embodiment and will not be repeated herein.

The auxiliary information may include a cell detection trigger threshold value.

The cell detection trigger threshold value may be a threshold value for measurement, performed by the first D2D UE, over a signal sent by the relay node.

Herein, the cell detection trigger threshold value may be a threshold value for measurement, performed by the first D2D UE, over a signal sent by the relay node, and may be used for triggering, when a measurement value obtained by measuring the signal sent by the relay node by the first D2D UE is smaller than the cell detection trigger threshold value, the first D2D UE to start cell detection to search for a cell allowing access of the first D2D UE.

Before sending the auxiliary information to the first D2D UE, the method may further include the following acts.

A request may be made to the first base station for a dedicated random access resource.

Dedicated random access resource information sent by the first base station may be received.

The random access resource information in the present embodiment may be one of basis information forming the auxiliary information or one of information contents serving as the auxiliary information.

When the first D2D UE switches to the first base station for communication data transmission, in order to reduce resource waste, it may be suggested to release connection between the first D2D UE and the relay node. Two relay connection release manners are provided as follows.

First Relay Connection Release Manner

A connection release message may be received from the first D2D UE.

After the connection release message is received, a connection with the first D2D UE is released. During implementation of the present embodiment, in order to ensure lossless transmission of data of the first D2D UE in a switch process of an access node, the relay node releases connection after receiving specified time of the connection release message. By virtue of the solution, a problem of interruption of communication data transmission caused by immediate connection release and non-immediate successful switching of the first D2D UE to access from the first base station, or a problem of failure in access of the first D2D UE to a network caused by instable connection of the first base station or poor signal quality.

Second Relay Connection Release Manner

When a connection release activation timer expires, a connection with the first D2D UE is released.

The connection release activation timer may be arranged in the relay node. Usually, the connection release activation timer may be initiated to start timing when the first D2D UE sends data to the relay node or the relay node sends data to the first D2D UE. When the connection release activation timer expires, a relay connection with the first D2D UE may be automatically released.

As another exemplary implementation, the first access node may be a first base station, and the second access node may be a relay node located in a first cell, where the first cell may be a cell subordinate to the first base station, and the relay node may be a second D2D UE.

In this case, the act S220 may include the following act. The first base station may send the auxiliary information to the first D2D UE.

The auxiliary information may include node information of a relay node to which the first D2D UE is accessible, and the relay node may be a second D2D UE.

In this case, the node information may include at least one of: a relay node identifier, D2D discovery resource information used by a D2D relay node, D2D communication resource information available for D2D communication between the first D2D UE and the relay node, and D2D communication bearer configuration information for D2D communication between the first D2D UE and the relay node. These pieces of information may provide basis for node access of the first D2D UE.

The auxiliary information may further include a relay node discovery trigger threshold value and/or measurement reporting configuration information. The relay node discovery trigger threshold value may be used for triggering the first D2D UE to discover a relay node available for access of the first D2D UE. The measurement reporting configuration information here may be used for triggering the first D2D UE to measure the first cell and/or a second cell, and report a measurement result about the first cell and/or the second cell to the first base station, where the second cell may be a neighbor cell of the first cell.

The relay node discovery trigger threshold value may include a first threshold value.

The first threshold value is a threshold value for measurement, performed by the first D2D UE, over the first cell.

Herein, the first threshold value may be used for triggering, when a measurement value obtained by measuring the first cell by the first D2D UE is smaller than the first threshold value, the first D2D UE to start relay node discovery to search for a relay node available for access of the first D2D UE.

The relay node discovery trigger threshold value may further include a second threshold value. The second threshold value may be a threshold value for measurement, performed by the first D2D UE, over a neighbor cell (i.e., second cell) of the first cell. The second threshold value may be used for triggering, when a measurement value obtained by measuring the first cell by the first D2D UE is smaller than a first threshold value and a measurement value obtained by measuring the second cell by the first D2D UE is smaller than the second threshold value, the first D2D UE to start relay node discovery to search for a relay node available for access of the first D2D UE.

Figure 6:
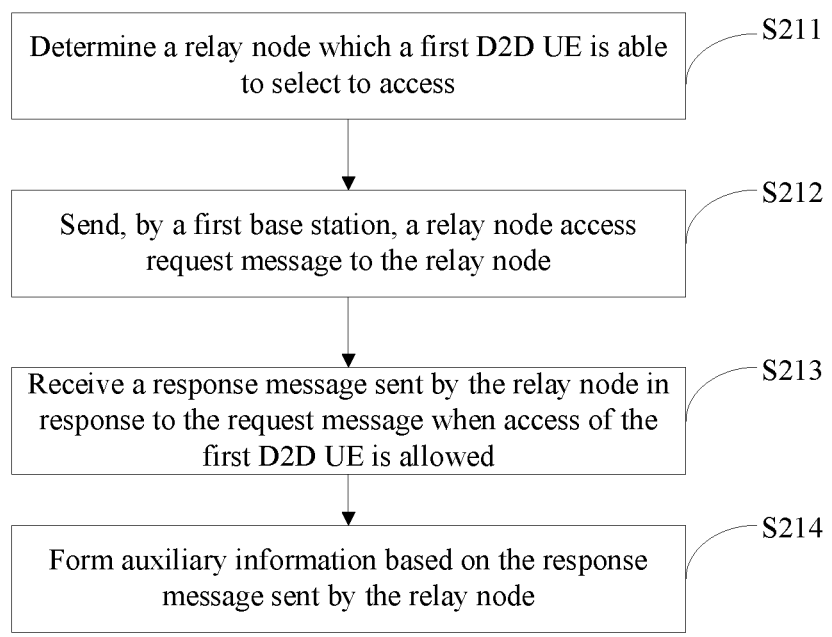
FIG. 6 is a flowchart of forming auxiliary information by a first access node according to an embodiment of the present disclosure.

The act S210 may include: determining a relay node which the first D2D UE is able to select to access; and forming the auxiliary information based on the determined relay node. As shown in FIG. 6, the act S210 may include the acts as follows.

At act S211, a relay node which the first D2D UE is able to select to access may be determined.

At act S212, the first base station may send a relay node access request message to the relay node.

At act S213, a response message sent by the relay node in response to the request message when access of the first D2D UE is allowed may be received.

At act S214, the auxiliary information may be formed based on the response message sent by the relay node.

The present embodiment provides a method of forming the auxiliary information, which has the advantage of simple and convenient implementation. At act S211, when the relay node which the first D2D UE is able to select to access is determined, the relay node may be determined according to a current location of the first D2D UE and the location of each D2D UE capable of serving as the relay node. At act S212, the first base station may send the relay node access request message to the relay node selected at act S211.

Before act S210, the method may further include: receiving relay node related information from the first D2D UE. The relay node related information may be used to inform the first base station of a request from the first D2D UE for switching to the relay node for communication data transmission.

In this case, the first D2D UE may specify a relay node to which the first D2D UE wants to access, or the first D2D UE may discover a relay node available for access thereof in a manner such as D2D discovery. The information of the determined relay node may be sent to a first base station serving as a first access node, thereby making it convenient for the first base station to confirm and form the auxiliary information for switching an access node of the first D2D UE.

In the present embodiment, the relay node related information may include, but not limited to, at least one of:
a relay node access request indicator;
an identifier of a relay node which the first D2D UE wants to access;
relay node information detected by the first D2D UE;
current location information of the first D2D UE; and
a measurement result measured by the first D2D UE over an accessed relay node, and/or
a serving cell, and/or a neighbor cell.

The serving cell may be a cell serving the first D2D UE. The neighbor cell may be a neighbor cell of the serving cell.

In conclusion, the present embodiment describes, from the perspective of an access node connected with the first D2D UE, how to implement switch of an access node of the first D2D UE. The solution has the advantage of simple and convenient implementation, enables the first D2D UE to flexibly switch the access node according to a specific application scenario, and improves the communication quality.

After the access node for the first D2D UE is switched or the first D2D UE is connected with two access nodes at the same time, a problem of bearer switchover, for example, switching to the second access node for communication data transmission, may exist. In this case, the method may further include the act as follows.

At act S230, bearer control information may be sent to the first D2D UE.

Herein, the bearer control information may be used for providing basis for switching the first D2D UE to the second access node for communication data transmission.

In the present embodiment, the act S230 and the act S210 are not in a certain sequence, for example, the act S230 may be executed before the act S210, and may alternatively be executed before the act S220. A communication node for sending the bearer control information is the base station generally, and if the first base station is a second access node, the act S230 may be executed after the act S210.

The bearer control information may include a bearer switch indicator or bearer switchover judgment parameter information.

The bearer switch indicator may be used to indicate switch of the first D2D UE to the second access node for communication data transmission. The bearer switchover judgment parameter information may be used for the first D2D UE to determine whether the first D2D UE can switch to the second access node for communication data transmission.

Usually, the bearer switch indicator directly indicates bearer switch of the first D2D UE, so as to perform communication data transmission through the second access node. Thus, the first D2D UE will no longer execute operations such as judgment. If the bearer switchover judgment parameter information is sent to the first D2D UE, after receiving the bearer switchover judgment parameter information, the first D2D UE may perform channel measurement, judge a channel measurement result according to the bearer switchover judgment parameter information, and then determine whether to perform bearer switchover.

As another improvement of the present embodiment, before sending bearer control information to the first D2D UE, the method may further include: receiving bearer switchover judgment auxiliary information sent by the first D2D UE; and forming the bearer control information according to the bearer switchover judgment auxiliary information.

The bearer switchover judgment auxiliary information may further include at least one of:

UE to NW relay indication information, a measurement report, and location information.

Herein, the UE to NW relay indication information may be used to indicate that the first D2D UE currently performs data transmission through a UE to NW relay.

The measurement report may contain an RRM measurement result obtained by measuring a current serving cell and/or neighbor cell by the first D2D UE and/or a measurement result of the first D2D UE about a signal sent by the first access node.

The location information may include current geographical location information of the first D2D UE.

The measurement report may be a measurement report formed when the second measurement result satisfies a reporting condition.

Both the above two manners have the advantage of simple and convenient implementation, and solve a problem of bearer switchover caused by the movement of UE.

Two specific examples are provided hereinbelow in combination with any one of the above embodiments.

First Example

Figure 7:
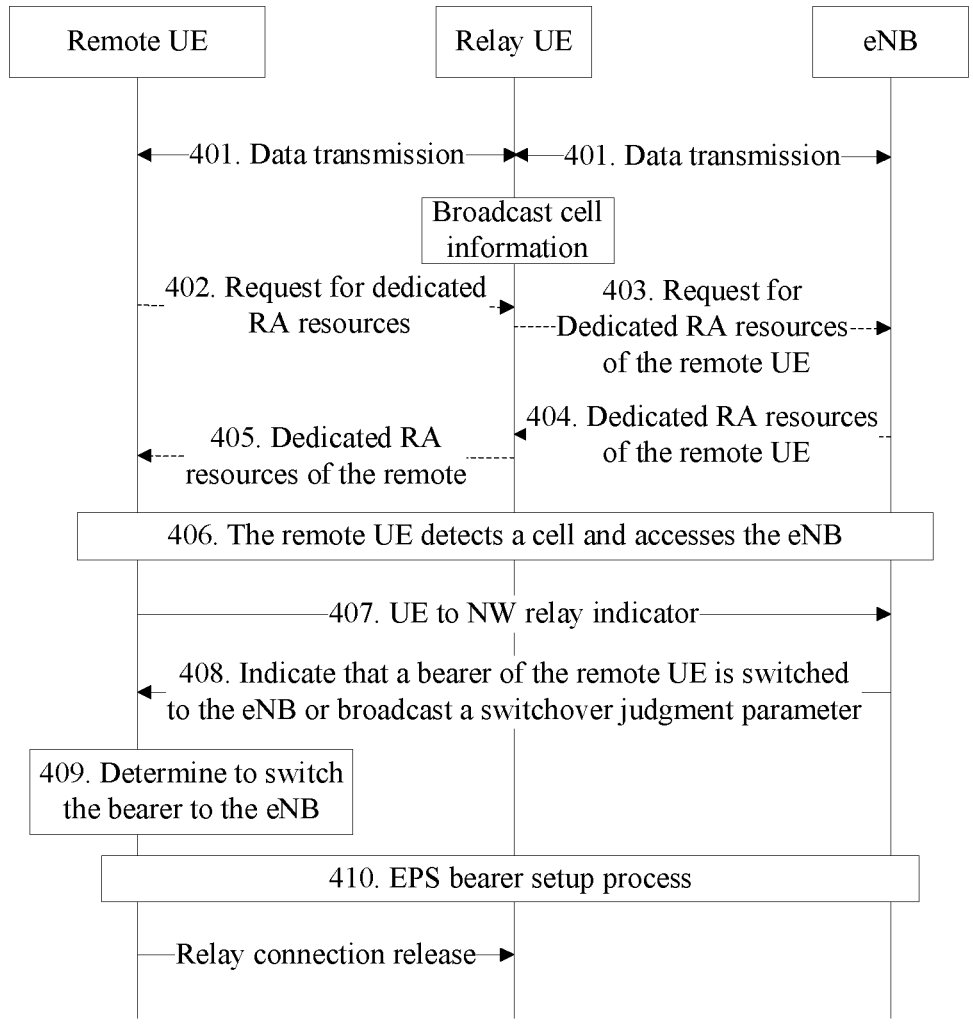
FIG. 7 is a first diagram showing switch of an access node according to an example in an embodiment of the present disclosure.

The present example describes a method flow of switching to network access through a base station (for example, an eNB) after a remote UE of a relay UE moves to a coverage range of the base station. FIG. 7 is a flowchart of the method in the present example. The method in the present example may include the acts as follows.

At act 401, under a current scenario, a remote UE may perform data transmission with a base station (for example, an eNB) via a relay UE, and the relay UE may send auxiliary information in a broadcast manner so as to assist the remote UE in more quickly detecting a neighbor cell. For example, the auxiliary information may be information of a cell where the relay UE is located or a neighbor cell or a proximal cell. The cell information may include one or combination of the following: a frequency point, a cell identifier, a cell access barring indicator, and a cell access probability parameter.

The cell access barring indicator may be used to indicate that access to the cell may be barred, for example, in case of heavy load of the cell. The cell access probability parameter may also be used to control the number of UEs accessing the cell. For example, the value range of the cell access probability parameter is 0-1, the remote UE may select a random number within a range of 0 to 1, if the random number is smaller than the cell access probability parameter, the remote UE may be allowed to access the cell, and otherwise, the remote UE may be barred from accessing the cell.

The relay UE may learn of a load situation of the serving cell and/or the neighbor cell according to an Access Class Barring (ACB) parameter value broadcast in a System Information Block (SIB) of the serving cell and/or the neighbor cell. In addition, in view of load balancing, the relay UE may only broadcast information of a light-load cell/neighbor cell to the remote UE. For example, if the load of a cell where the relay UE is located is heavy (the relay UE may perform judgment according to an Access Class (AC) parameter), access barring of the cell where the relay UE is located may be indicated, or an access probability parameter may be broadcast, or frequency point/Physical Cell Identifier (PCI) information of the cell where the relay UE is located may not be broadcast, so as to avoid from UE detection and attempting to access the cell where the relay UE is located.

Besides, in addition to a manner of broadcasting via the relay UE, the auxiliary information may also be obtained after the remote UE actively sends a request to the relay UE. For example, when the remote UE detects that the remote UE is entering a coverage range of a cell, the remote UE may request auxiliary information from the relay UE.

At act 402, if the remote UE is desired to execute a non-contention Random Access (RA) process, the remote UE may request dedicated RA resources from the relay UE. The dedicated RA resources may include a dedicated random access preamble and dedicated time and frequency domain resources.

At act 403, optionally, after receiving a dedicated RA resource request, the relay UE may request dedicated RA resources for the remote UE from the base station.

At act 404, if the base station receives the dedicated RA resource request, the dedicated RA resources for the remote UE may be sent to the relay UE.

At act 405, after receiving the dedicated RA resources allocated to the remote UE by the base station, the relay UE may send the dedicated resources to the remote UE.

Figure 8:
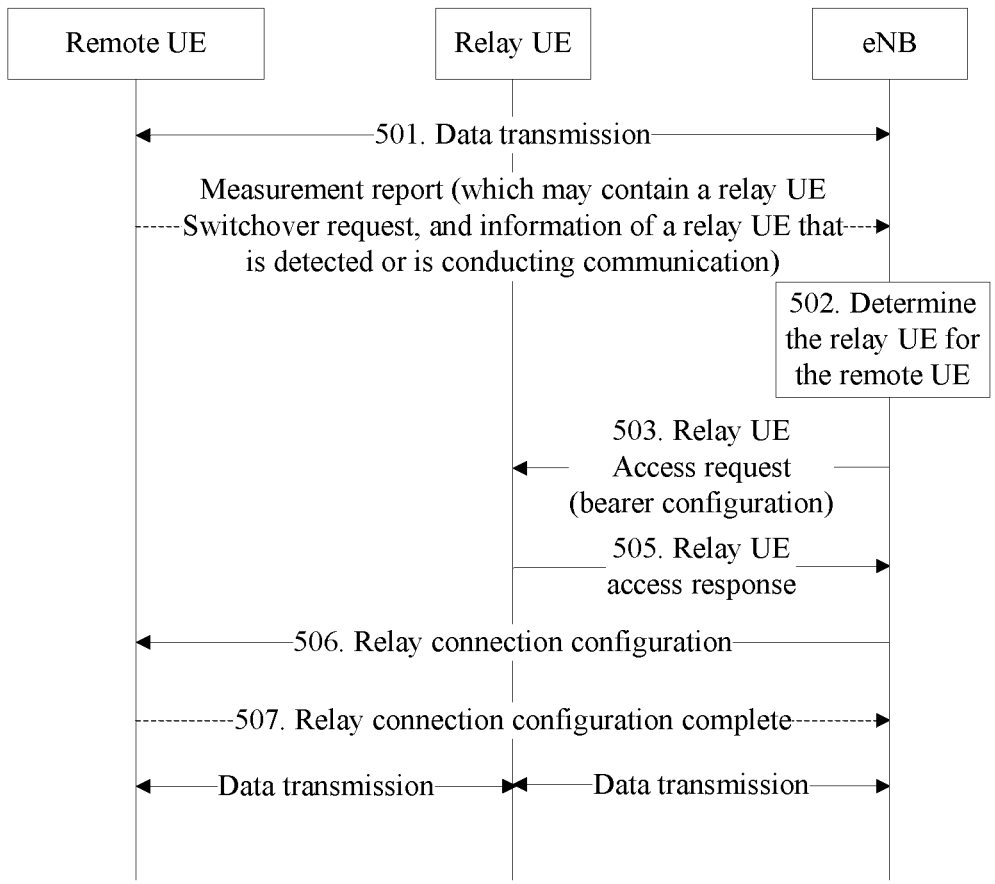
FIG. 8 is a second diagram showing switch of an access node according to an example in an embodiment of the present disclosure.

At act 406, the remote UE may detect an available cell according to the auxiliary information received from the relay UE and/or the dedicated RA resources, and access the cell. For example, the remote UE as shown in FIG. 8 may detect the cell and access the base station.

At act 407, optionally, the remote UE may send a UE to NW relay indicator to the accessed base station. The indicator may be used to indicate that the remote UE is accessing the network via a UE to NW relay of the relay UE. As an exemplary implementation, the remote UE may also inform the base station of information of the accessed relay UE (such as identifier) and location information of the remote UE. As an exemplary implementation, the remote UE may also report a measurement result thereof about the relay UE and the serving cell/neighbor cell to the base station. Before sending the measurement report to the base station, the remote UE may receive measurement reporting configuration information sent by the base station, and report the measurement result to the base station according to the measurement reporting configuration information when a measurement reporting condition is satisfied. As an exemplary implementation, the remote UE may send a bearer switchover request to the base station, and request to access via the base station for communication data transmission. A UE to NW relay indicator in FIG. 7 is the foregoing UE to NW relay indicator.

At act 408, if the base station determines that the remote UE may switch a bearer to the base station, i.e., the base station accesses the network to perform communication data transmission, a bearer switchover indicator may be sent to the remote UE and used to indicate that the remote UE switches from the D2D relay node to the base station for communication data transmission.

At act 409, alternatively, the base station may broadcast bearer switchover judgment parameter information used for the remote UE to judge whether to execute bearer switchover, i.e., whether to accept a switch from the relay UE to the base station for communication data transmission. The bearer switchover judgment parameter information may include one or combination of the following: an RRM measurement threshold value of UE for a serving cell and/or a neighbor cell; and a measurement threshold value of D2D communication between UE and a D2D relay node.

It needs to be noted that the act 409 may replace the act 407 and the act 408. That is, if the base station broadcasts bearer switchover judgment parameter information, the remote UE may not need to report a UE to NW relay indicator to the base station, and the base station may not need to execute bearer switchover judgment and may not need to send a bearer switchover indicator to the UE; instead, the remote UE may determine whether to transmit data through the base station.

At act 410, if receiving the bearer switchover indicator, the remote UE may determine to transmit cellular communication data through the base station, and initiate an Evolved Packet System (EPS) bearer setup process. Optionally, the remote UE may send a relay connection release message to the relay UE so as to inform the relay UE; or, the relay UE may release a connection with the remote UE after a connection release activation timer (started/restarted when receiving or sending D2D data to the remote UE) expires. Alternatively, if the remote UE receives bearer switchover judgment parameter information, the remote UE may determine whether the base station transmits cellular communication data according to a measurement result thereof about a serving cell and/or a neighbor cell and/or a D2D relay node. If the measurement result satisfies a predefined criterion, it may be determined that the base station transmits the cellular communication data, and the EPS bearer setup process may be initiated.

Second Example

The present embodiment describes a method flow of switching to network access through a UE to NW relay of a relay UE after a UE accessed through a base station (for example, an eNB) moves out of a coverage range of a base station. FIG. 8 is a flowchart of the method in the present example. As shown in FIG. 8, the method in the present embodiment may include the acts as follows.

At act 501, UE may access a network through a base station and transmit data. In a process that the UE moves out of a coverage range of a cell, the UE may send a relay node access request indicator to the base station, so as to request the base station for converting into a communication manner of access through a D2D relay node. As an exemplary implementation, the UE may also report an identifier of the D2D relay node already accessed by the UE or D2D relay node information (such as identification information) detected by the UE to the base station. As an exemplary implementation, the UE may report current location information thereof, or measurement results thereof about the accessed relay UE, a serving cell and a neighbor cell to the base station.

At act 502, the base station may determine that the UE needs to switch to a UE to NW relay of relay UE for accessing the network, and may select one relay UE for the UE. As an exemplary implementation, the base station may execute judgment and select the relay UE according to the information reported by the UE. As mentioned at act 501, the information reported by the UE may include one or combination of the following: a relay node access request indicator, an identifier of a D2D relay node already accessed by UE or D2D relay node information (such as identification information) detected by UE, current location information of UE, or measurement results of UE about the accessed relay UE, a serving cell and a neighbor cell.

At act 503, the base station may send a relay access request message to the selected D2D relay node. The relay access request message may include: identification information of a remote UE, communication service Quality of Service (QoS) demand information of a remote UE, D2D security capability information, D2D security relevant parameter information, D2D communication group identification information of a remote UE, a D2D relay type (i.e., UE to NW relay) requested by a remote UE, priority information of a remote UE, priority information of a D2D communication group where a remote UE is located, priority information of a D2D communication service of a remote UE, and configuration information for D2D communication between a remote UE and a relay UE. Herein, the communication service QoS demand information of the remote UE may contain information such as a QoS Class Identifier (QCI), an Allocation and Retention Priority (ARP), a Guaranteed Bit Rate (GBR), and a Maximum Bit Rate (MBR). Herein, the configuration information of the D2D communication between the remote UE and the relay UE may contain D2D communication bearer configuration information, security relevant configuration information and the like. QoS is an abbreviation for quality of service.

At act 504, after receiving a relay access request message, the relay UE may need to execute admission control, and judge whether to allow the remote UE to access the network through a relay of the relay UE. As an exemplary implementation, the relay UE may determine whether to allow access of the remote UE according to its own relay capability, transmitting and receiving capabilities, the number of D2D UE already accessed, priority information, and communication service QoS demand information of D2D UE.

At act 505, if the relay UE allows access of the remote UE, a relay access response message may be sent to the base station. The relay access response message may include:

identification information of a remote UE, and configuration information for D2D communication between a remote UE and a relay UE. Herein, the configuration information of the D2D communication between the remote UE and the relay UE may include D2D communication bearer configuration information, security relevant configuration information and the like. If the relay UE does not allow access of the remote UE, a refusal message may be returned to the base station, and the base station may select other relay UE candidates for the remote UE.

At act 506, after receiving the relay access response message, the base station may send access node switch information to the remote UE so as to command the remote UE to access the relay UE. The access node switch information may include: information of a D2D relay node to be accessed, D2D communication resource information available for D2D communication between a remote UE and a relay UE, D2D communication bearer configuration information for D2D communication between a remote UE and a relay UE, and a bearer switchover indicator. As an exemplary implementation, the configuration information of the D2D communication between the remote UE and the relay UE may include D2D communication bearer configuration information, security relevant configuration information and the like. The bearer switchover indicator may be used to indicate whether the remote UE switches from the base station to the relay UE for communication data transmission.

At act 507, if the remote UE confirms to access the network through the relay of the relay UE to perform cellular communication, a confirmation message may be sent to the base station. Then, the remote UE may perform cellular communication through data forwarding of the relay UE.

It needs to be noted that in the foregoing embodiments the base stations in both the First Example and Second Example may be the foregoing first base station, and the relay UE may be the second D2D UE. The remote UE may be the remote UE in the foregoing embodiments.

First Equipment Embodiment

Figure 9:
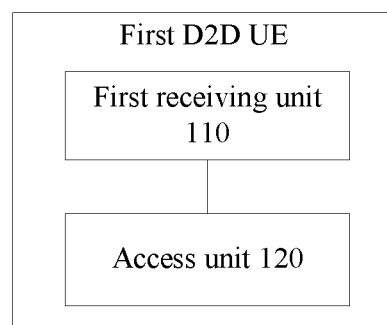
FIG. 9 is a structure diagram of a first D2D UE according to an embodiment of the present disclosure.

As shown in FIG. 9, the present embodiment provides a communication node. The communication node may be a first D2D UE. The first D2D UE may include: a first receiving unit 110 and an access unit 120.

The first receiving unit 110 may be configured to receive auxiliary information from a first access node of the first D2D UE.

The access unit 120 may be configured to access a second access node according to the auxiliary information.

The first access node and the second access node may be access nodes of different types.

In the present embodiment, the first D2D UE may be a communication terminal with a D2D communication function such as a mobile phone or a tablet computer. The first receiving unit 110 may include one or more receiving antennae in the first D2D UE.

The access unit 120 may include processors of various types. The processors may control the first D2D UE to access the second access node according to the auxiliary information by executing specified codes. The processors may include an electronic device with an information processing function or a set of electronic devices such as a central processing unit, a digital signal processor, a programmable logic controller, an application processor or a micro processing unit.

The first access node and the second access node may be access nodes of different types. For example, one of the access nodes may be fixed equipment mainly used for access of UE, and the other one of the access nodes may be equipment capable of moving and assisting other UE in access such as a D2D UE capable of serving as a relay node.

The first D2D UE in the present embodiment may be used to implement the method in the method embodiment. The first D2D UE may acquire auxiliary information by sending an auxiliary information acquisition request to the first access node according to a current communication demand and a current communication scenario. The first D2D UE may access the second access node according to the auxiliary information or access the second access node according to auxiliary information actively pushed from the first access node. In a word, the first D2D UE in the present embodiment may access the second access node, so as to improve the communication quality and maintain the continuity of communication services.

The current access node of the first D2D UE may be embodied differently in two situations. The structure of each component in the first D2D UE and an association between the structures under different situations are introduced hereinbelow respectively.

First Situation

The second access node may be a first base station, and the first access node may be a relay node located in a first cell or a second cell. The first cell may be a cell subordinate to the first base station, the second cell may be a neighbor cell of the first cell, and the relay node may be a second D2D UE.

The first receiving unit 110 may be configured to receive the auxiliary information from the relay node. The auxiliary information may include at least one of: cell information of the first cell and/or the neighbor cell of the first cell, and dedicated random access resource information.

The cell information may include at least one of: a frequency point, a cell identifier, a cell access barring indicator, and a cell access probability parameter. The cell access barring indicator may be used to indicate that the first D2D UE is barred from accessing a corresponding cell. The cell access probability parameter may be used to control a quantity of UEs accessing a corresponding cell.

The auxiliary information may include a cell detection trigger threshold value.

The cell detection trigger threshold value may be a threshold value for measurement, performed by the first D2D UE, over a signal sent by the relay node, and may be used for triggering, when a measurement value obtained by measuring the signal sent by the relay node by the first D2D UE is smaller than the cell detection trigger threshold value, the first D2D UE to start cell detection to search for a cell allowing access of the first D2D UE. The cell here is a general term of cells formed by base stations of all types, including the first cell and the second cell.

Second Situation

The first access node may be a first base station, and the second access node may be a relay node located in a first cell. The first cell may be a cell subordinate to the first base station, and the relay node may be a second D2D UE.

The first receiving unit 110 may be configured to receive the auxiliary information from the first base station. The auxiliary information may include node information of a relay node to which the first D2D UE is accessible, and the relay node may be a second D2D UE.

The access unit 120 may be configured to access the relay node according to the auxiliary information.

In this case, the node information may include at least one of: a relay node identifier, D2D discovery resource information used by a D2D relay node, D2D communication resource information available for D2D communication between the first D2D UE and the relay node, and D2D communication bearer configuration information for D2D communication between the first D2D UE and the relay node. These pieces of information may provide basis for node access of the first D2D UE.

The auxiliary information may include a relay node discovery trigger threshold value and/or measurement reporting configuration information.

The relay node discovery trigger threshold value may be used for triggering the first D2D UE to discover a relay node available for access of the first D2D UE. The measurement reporting configuration information here may be used for triggering the first D2D UE to measure the first cell and/or a second cell, and report a measurement result about the first cell and/or the second cell to the first base station, where the second cell may be a neighbor cell of the first cell.

The relay node discovery trigger threshold value may include a first threshold value. The first threshold value may be a threshold value for measurement, performed by the first D2D UE, over the first cell. Herein, the first threshold value may be used for triggering, when a measurement value obtained by measuring the first cell by the first D2D UE is smaller than the first threshold value, the first D2D UE to start relay node discovery to search for a relay node available for access of the first D2D UE. The first threshold value may be an RSRP value and/or an RSRQ value.

The relay node discovery trigger threshold value may further include a second threshold value. The second threshold value may be a threshold value for measurement, performed by the first D2D UE, over a neighbor cell (i.e., second cell) of the first cell. The second threshold value may be used for triggering, when a measurement value obtained by measuring the first cell by the first D2D UE is smaller than a first threshold value and a measurement value obtained by measuring the second cell by the first D2D UE is smaller than the second threshold value, the first D2D UE to start relay node discovery to search for a relay node available for access of the first D2D UE. The second threshold value may be an RSRP value and/or an RSRQ value.

Since the first D2D UE is connected with the first base station, in order to switch to the relay node to perform communication data transmission, it may be needed to acquire information of optional relay nodes from the auxiliary information, such as a relay node identifier, and information of a discovery resource and/or a communication resource.

The first receiving unit 110 may be further configured to receive bearer control information.

The first D2D UE may further include a first switching unit.

The first switching unit may be configured to switch, according to the bearer control information, to the second access node for communication data transmission.

The structure of the first switching unit may correspond to any one of the above processors likewise.

The bearer control information may include a bearer switch indicator. The bearer switch indicator may be used to indicate switch of the first D2D UE to the second access node for communication data transmission. The first switching unit may be configured to switch, according to the bearer control information, to the second access node for communication data transmission.

The bearer control information may include bearer switchover judgment parameter information. In this case, the first D2D UE may further include: a first measurement unit and a judgment unit.

The first measurement unit may be configured to perform channel measurement based on a measurement signal sent by the first base station to form a first measurement result.

The judgment unit may be configured to determine whether to switch to the second access node for communication data transmission according to the bearer switchover judgment parameter information and the first measurement result.

The first switching unit may be configured switch, if the judgment unit determines to switch to the second access node for communication data transmission according to the bearer switchover judgment parameter information and the first measurement result, to the second access node for communication data transmission.

The first measurement unit may be a parameter measurement sensor capable of measuring signal quality or signal intensity in the first D2D UE. A specific structure may refer to a measurement sensor for discovery signal measurement in relevant communication equipment such as a mobile phone, but is not limited to this structure.

The structure of the judgment unit may correspond to the structure of the processor with an information judgment function or a processing chip likewise.

The bearer switchover judgment parameter information may include at least one of: a threshold value for RRM measurement, performed by the first D2D UE, over a serving cell and a neighbor cell, and a threshold value for measurement over a signal sent by the second access node.

The first D2D UE may further include a first sending unit.

The first sending unit may be configured to send, before the first switching unit switches, according to the bearer control information, to the second access node for communication data transmission, bearer switchover judgment auxiliary information to the first base station. The first base station may be the first access node or the second access node.

The structure of the first sending unit in the present embodiment may include one or more sending antennae in the first D2D UE. The first receiving unit 110 and the second sending unit may be integrated into an antenna correspondingly having a transmitter function.

The bearer switchover judgment auxiliary information may further include at least one of:

UE to NW relay indication information, a measurement report, and location information.

Herein, the UE to NW relay indication information may be used to indicate that the first D2D UE currently performs data transmission through a UE to NW relay.

The measurement report may contain an RRM measurement result obtained by measuring a current serving cell and/or neighbor cell by the first D2D UE and/or a measurement result of the first D2D UE about a signal sent by the first access node.

The location information may include current geographical location information of the first D2D UE.

The first receiving unit 110 may be further configured to receive, before the first D2D UE sends a measurement report to the first base station, measurement reporting configuration information sent by the first base station.

The first D2D UE may further include a second measurement unit.

The second measurement unit may be configured to perform channel measurement according to the measurement reporting configuration information, so as to form a second measurement result.

The first sending unit may be further configured to send, when the second measurement result satisfies a reporting condition, the measurement report to the first base station.

The first sending unit may be further configured to send, when the second measurement result satisfies the reporting condition, the measurement report to the first base station. Relevant description of the reporting condition here may refer to corresponding description in the method embodiment, and will not be repeated herein.

Second Equipment Embodiment

The present embodiment provides a communication node. The communication node may be a first access node of a first D2D UE. The first access node in the present embodiment may be an eNB or a relay UE in FIG. 2 or FIG. 3.

Figure 10:
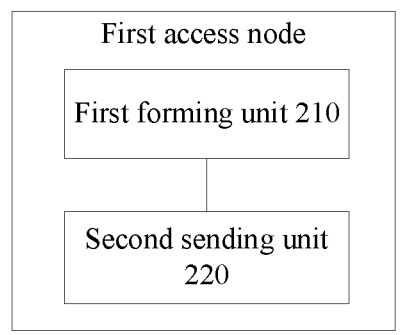
FIG. 10 is a structure diagram of a first access node according to an embodiment of the present disclosure.

As shown in FIG. 10, the first access node may include: a first forming unit 210 and a second sending unit 220.

The first forming unit 210 may be configured to form auxiliary information. The auxiliary information may be used for access of the first D2D UE to a second access node, and the first access node and the second access node may be access nodes of different types.

The second sending unit 220 may be configured to send the auxiliary information to the first D2D UE.

The first forming unit 210 may be processors or processing chips, having an information forming function, of various types. The type of the processor may refer to the first equipment embodiment, and will not be repeated herein.

The structure of the second sending unit 220 may include one or more sending antennae. When the first access node is a first base station, the structure of the second sending unit 220 may be a sending antenna array or the like.

The structures of the first access node and the second access node are introduced hereinbelow respectively.

As an exemplary implementation, the second access node may be a first base station, and the first access node may be a relay node located in a first cell or a second cell. The first cell may be a cell subordinate to the first base station, the second cell may be a neighbor cell of the first cell, and the relay node may be a second D2D UE.

The auxiliary information may include at least one of: cell information of the first cell and/or the neighbor cell of the first cell, and dedicated random access resource information.

The cell information may include at least one of: a frequency point, a cell identifier, a cell access barring indicator, and a cell access probability parameter.

Herein, the cell access barring indicator may be used to indicate that the first D2D UE is barred from accessing a corresponding cell. The cell access probability parameter may be used to control a quantity of UEs accessing a corresponding cell.

The auxiliary information may include a cell detection trigger threshold value.

The cell detection trigger threshold value may be a threshold value for measurement, performed by the first D2D UE, over a signal sent by the relay node, and may be used for triggering, when a measurement value obtained by measuring the signal sent by the relay node by the first D2D UE is smaller than the cell detection trigger threshold value, the first D2D UE to start cell detection to search for a cell allowing access of the first D2D UE.

Information contents and functions of these pieces of information may refer to the corresponding method embodiment, and will not be repeated herein.

In this case, the second sending unit 220 may be further configured to, before sending the auxiliary information to the first D2D UE, make a request to the first base station for a dedicated random access resource.

The first access node may further include a second receiving unit. The second receiving unit may be configured to receive dedicated random access resource information sent by the first base station.

The second receiving unit here may include one or more receiving antennae in the relay node.

The first access node may further include a release unit.

The release unit may be configured to receive a connection release message from the first D2D UE, and release, after receiving the connection release message, a connection with the first D2D UE; or may be configured to release, when a connection release activation timer expires, a connection with the first D2D UE.

The relay node in the present embodiment may further include a timer. The timer may trigger release of the connection with the first D2D UE in a countdown manner when counting down to 0. Initiation of the timer may refer to the corresponding method embodiment, and will not be repeated herein.

As another exemplary implementation, the first access node may be a first base station, and the second access node may be a relay node located in a first cell. The first cell may be a cell subordinate to the first base station, and the relay node may be a second D2D UE.

The auxiliary information may include node information of a relay node to which the first D2D UE is accessible, and the relay node may be a second D2D UE.

The node information may include at least one of: a relay node identifier, D2D discovery resource information used by a D2D relay node, D2D communication resource information available for D2D communication between the first D2D UE and the relay node, and D2D communication bearer configuration information for D2D communication between the first D2D UE and the relay node.

The first forming unit 210 may be configured to determine a relay node which the first D2D UE is able to select to access, and form the auxiliary information based on the determined relay node. The second sending unit 220 may be configured to send a relay node access request message to the relay node.

The first base station may further include a third receiving unit.

The third receiving unit may be configured to receive a response message sent by the relay node in response to the request message when access of the first D2D UE is allowed.

The first forming unit may be configured to form the auxiliary information based on the response message sent by the relay node.

The third receiving unit may include any air interface on the first base station, for example, an air interface formed by any one or more sending antennae.

The first access node may further include a fourth receiving unit.

The fourth receiving unit may be configured to receive, before the first forming unit 210 forms the auxiliary information, relay node related information from the first D2D UE. The relay node related information may be used for providing basis for forming the auxiliary information.

The fourth receiving unit and the third receiving unit here may be integrated to correspond to the same air interface on the first base station such as the same X2 interface, or may correspond to different air interfaces.

The relay node related information may include at least one of: a relay node access request indicator; an identifier of a relay node which the first D2D UE wants to access; relay node information detected by the first D2D UE; current location information of the first D2D UE; and a measurement result measured by the first D2D UE over an accessed relay node, and/or a serving cell, and/or a neighbor cell.

If the communication node is the first base station, the second sending unit 220 may be further configured to send bearer control information to the first D2D UE.

The bearer control information may be used for providing basis for switching the first D2D UE to the second access node for communication data transmission.

The bearer control information may include a bearer switch indicator. The bearer switch indicator may be used to indicate switch of the first D2D UE to the second access node for communication data transmission.

The bearer control information may include bearer switchover judgment parameter information. The bearer switchover judgment parameter information may be used for the first D2D UE to determine whether to switch to the second access node for communication data transmission.

The communication node may further include a fifth receiving unit. The fifth receiving unit may be configured to receive, before the second sending unit 220 sends bearer control information to the first D2D UE, bearer switchover judgment auxiliary information sent by the first D2D UE. The first forming unit 210 may be configured to form the bearer control information according to the bearer switchover judgment auxiliary information.

The auxiliary information may include a relay node discovery trigger threshold value and/or measurement reporting configuration information. The relay node discovery trigger threshold value may be used for triggering the first D2D UE to discover a relay node available for access of the first D2D UE. The measurement reporting configuration information may be used for triggering the first D2D UE to measure the first cell and/or a second cell, and report a measurement result about the first cell and/or the second cell to the first base station, where the second cell may be a neighbor cell of the first cell.

The relay node discovery trigger threshold value may include a first threshold value. The first threshold value is a threshold value for measurement, performed by the first D2D UE, over the first cell. Herein, the first threshold value may be used for triggering, when a measurement value obtained by measuring the first cell by the first D2D UE is smaller than the first threshold value, the first D2D UE to start relay node discovery to search for a relay node available for access of the first D2D UE.

The relay node discovery trigger threshold value may further include a second threshold value. The second threshold value may be a threshold value for measurement, performed by the first D2D UE, over the second cell. The second threshold value may be used for triggering, when a measurement value obtained by measuring the first cell by the first D2D UE is smaller than a first threshold value and a measurement value obtained by measuring the second cell by the first D2D UE is smaller than the second threshold value, the first D2D UE to start relay node discovery to search for a relay node available for access of the first D2D UE.

Information contents of the bearer switchover judgment auxiliary information may refer to the foregoing embodiments, and will not be repeated herein.

The communication node may further include a sixth receiving unit. The sixth receiving unit may be configured to receive an auxiliary information acquisition request sent by the first D2D UE. The first forming unit 210 may be configured to form the auxiliary information in response to the auxiliary information acquisition request. In the communication node in the present embodiment, any two receiving units and/or sending units located on the same communication node may correspond to a communication interface having transmission and reception functions at the same time, such as a transceiver antenna.

The embodiment of the present disclosure provides a computer-readable storage medium in which a computer-executable instruction is stored. When the computer-executable instruction is executed, the information processing method applied to the first D2D UE may be implemented.

The embodiment of the present disclosure provides a computer-readable storage medium in which a computer-executable instruction is stored. When the computer-executable instruction is executed, the information processing method applied to the first access node of the first D2D UE may be implemented.

In some embodiments provided by the present application, it should be understood that the disclosed equipment and method may be implemented in other manners. The equipment embodiment described above is only schematic. For example, division of the units may be only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the equipment or the units, and may be electrical and mechanical or adopt other forms.

The abovementioned units described as separate parts may or may not be physically separated. Parts displayed as units may or may not be physical units, and namely may be located in the same place, or may also be distributed to multiple network units. Part or all of the units may be selected to achieve the purpose of the solutions of the embodiment according to a practical requirement.

In addition, each function unit in each embodiment of the present application may be integrated into a processing unit, each unit may alternatively exist independently, and two or more than two units may also be integrated into a unit. The abovementioned integrated unit may be implemented in a hardware form, and may alternatively be implemented in form of hardware and software function unit. The present application is not limited to combination of hardware and software in any specific form.

A person of ordinary skill in the art should know that all or part of the acts of the abovementioned method embodiment may be implemented by instructing related hardware (such as processor) through a program. The abovementioned program may be stored in a computer-readable storage medium, and the program may be executed to execute the acts of the abovementioned method embodiment. The abovementioned storage medium may include: various media capable of storing program codes such as mobile storage equipment, a Read-Only Memory (ROM), a Random Access Memory (RAM), a magnetic disk or an optical disk.

The above is only the exemplary implementation manner of the present application and not intended to limit the scope of protection of the present disclosure. Any variations or replacements apparent to those skilled in the art within the technical scope disclosed by the present application shall fall within the scope of protection of the present application. Therefore, the scope of protection of the present application shall be subject to the scope of protection of the claims.

INDUSTRIAL APPLICABILITY

Some embodiments of the present application provide an information processing method and a communication node. An ignored problem of node switch or supplementation of a D2D UE may be solved, and meanwhile, a problem of communication interruption or poor communication quality caused by delayed node switch of the D2D UE may also be solved.

What is claimed is:

1. An information processing method, applied to a first Device-to-Device (D2D) User Equipment (UE), the method comprising:
receiving auxiliary information from a first access node of the first D2D UE; and
accessing to a second access node according to the auxiliary information,
wherein the first access node and the second access node are access nodes of different types, wherein the first access node is a first base station, and the second access node is a relay node located in a first cell; and the relay node is a second D2D UE,
wherein receiving the auxiliary information from the first access node of the first D2D UE comprises:
receiving the auxiliary information from the first base station, wherein the auxiliary information comprises a relay node discovery trigger threshold value, wherein the relay node discovery trigger threshold value is used for triggering the first D2D UE to discover a relay node available for access of the first D2D UE, the method further comprising:
receiving bearer control information; and switching, according to the bearer control information, to the second access node for communication data transmission.

2. The method as claimed in claim 1, wherein
receiving the auxiliary information from the first access node of the first D2D UE comprises:
receiving the auxiliary information from the first base station, wherein the auxiliary information comprises node information of a relay node to which the first D2D UE is accessible, and the relay node is the second D2D UE;
accessing the second access node according to the auxiliary information comprises:
accessing the relay node according to the auxiliary information;
wherein the node information comprises at least one of:
a relay node identifier;
D2D discovery resource information used by a D2D relay node;
D2D communication resource information available for D2D communication between the first D2D UE and the relay node; and D2D communication bearer configuration information for D2D communication between the first D2D UE and the relay node.

3. The method as claimed in claim 1, wherein, the relay node discovery trigger threshold value comprises a first threshold value, the first threshold value is a threshold value for measurement, performed by the first D2D UE, over the first cell, wherein the first threshold value is used for triggering, when a measurement value obtained by measuring the first cell by the first D2D UE is smaller than the first threshold value, the first D2D UE to start relay node discovery to search for a relay node available for access of the first D2D UE;
and/or,
the relay node discovery trigger threshold value further comprises a second threshold value, wherein the second threshold value is a threshold value for measurement, performed by the first D2D UE, over the second cell; and the second threshold value is used for triggering, when a measurement value obtained by measuring the first cell by the first D2D UE is smaller than a first threshold value and a measurement value obtained by measuring the second cell by the first D2D UE is smaller than the second threshold value, the first D2D UE to start relay node discovery to search for a relay node available for access of the first D2D UE.

4. The method as claimed in claim 1, further comprising:
sending an auxiliary information acquisition request to the first access node, wherein receiving the auxiliary information from the first access node of the first D2D UE comprises: receiving auxiliary information sent by the first access node in response to the auxiliary information acquisition request.

5. The method as claimed in claim 1, wherein receiving the auxiliary information from the first access node of the first D2D UE comprises:
receiving the auxiliary information by receiving cell information broadcast or unicast by the first access node; or,
receiving the auxiliary information by receiving dedicated random access resource information unicast by the first access node.

6. An information processing method, applied to a first access node of a first Device-to-Device (D2D) User Equipment (UE), the method comprising:
forming auxiliary information, wherein the auxiliary information is used for access of the first D2D UE to a second access node, and the first access node and the second access node are access nodes of different types; and
sending the auxiliary information to the first D2D UE, wherein the first access node is a first base station, and the second access node is a relay node located in a first cell, and the relay node is a second D2D UE, wherein the auxiliary information comprises a relay node discovery trigger threshold value, wherein the relay node discovery trigger threshold value is used for triggering the first D2D UE to discover a relay node available for access of the first D2D UE, the method further comprising:
sending bearer control information to the first D2D UE, wherein the bearer control information is used for providing basis for switching the first D2D UE to the second access node for communication data transmission.

7. The method as claimed in claim 6, further comprising:
receiving a connection release message from the first D2D UE, and releasing, after receiving the connection release message, a connection with the first D2D UE; or,
releasing, when a connection release activation timer expires, a connection with the first D2D UE.

8. The method as claimed in claim 6, wherein sending the auxiliary information to the first D2D UE comprises: sending, by the first base station, the auxiliary information to the first D2D UE, wherein the auxiliary information comprises node information of a relay node to which the first D2D UE is accessible, and the relay node is the second D2D UE;
wherein the node information comprises at least one of:
a relay node identifier;
D2D discovery resource information used by a D2D relay node;
D2D communication resource information available for D2D communication between the first D2D UE and the relay node; and
D2D communication bearer configuration information for D2D communication between the first D2D UE and the relay node.

9. The method as claimed in claim 6, wherein,
the relay node discovery trigger threshold value comprises a first threshold value; the first threshold value is a threshold value for measurement, performed by the first D2D UE, over the first cell; and the first threshold value is used for triggering, when a measurement value obtained by measuring the first cell by the first D2D UE is smaller than the first threshold value, the first D2D UE to start relay node discovery to search for a relay node available for access of the first D2D UE;
and/or,
the relay node discovery trigger threshold value further comprises a second threshold value, wherein the second threshold value is a threshold value for measurement, performed by the first D2D UE, over the second cell; and the second threshold value is used for triggering, when a measurement value obtained by measuring the first cell by the first D2D UE is smaller than a first threshold value and a measurement value obtained by measuring the second cell by the first D2D UE is smaller than the second threshold value, the first D2D UE to start relay node discovery to search for a relay node available for access of the first D2D UE.

10. The method as claimed in claim 6, wherein forming the auxiliary information comprises:
determining a relay node which the first D2D UE is able to select to access; and forming the auxiliary information based on the determined relay node;
or,
sending, by the first base station, a relay node access request message to the relay node; receiving a response message sent by the relay node in response to the request message when access of the first D2D UE is allowed; and forming the auxiliary information based on the response message.

11. The method as claimed in claim 6, before forming the auxiliary information, the method further comprising:
receiving relay node related information from the first D2D UE, wherein the relay node related information is used for providing basis for forming the auxiliary information;
wherein the relay node related information comprises at least one of:
a relay node access request indicator;
an identifier of a relay node which the first D2D UE wants to access;
relay node information detected by the first D2D UE;
current location information of the first D2D UE; and
a measurement result measured by the first D2D UE over an accessed relay node, and/or a serving cell, and/or a neighbor cell.

12. The method as claimed in claim 6, further comprising:
receiving an auxiliary information acquisition request sent by the first D2D UE, wherein forming the auxiliary information comprises: forming the auxiliary information in response to the auxiliary information acquisition request.

13. A communication node, the communication node being a first Device-to-Device (D2D) User Equipment (UE), the communication node comprising:
a first receiving unit, configured to receive auxiliary information from a first access node of the first D2D UE; and
an access unit, configured to access a second access node according to the auxiliary information,
wherein the first access node and the second access node are access nodes of different types, wherein the first access node is a first base station, and the second access node is a relay node located in a first cell; and the relay node is a second D2D UE, wherein receiving the auxiliary information from the first access node of the first D2D UE comprises:
receiving the auxiliary information from the first base station, wherein the auxiliary information comprises a relay node discovery trigger threshold value, wherein the relay node discovery trigger threshold value is used for triggering the first D2D UE to discover a relay node available for access of the first D2D UE, wherein
the first receiving unit is further configured to receive bearer control information,
the communication node further comprises:
a first switching unit, configured to switch, according to the bearer control information, to the second access node for communication data transmission.

14. A communication node, the communication node being a first access node of a first Device-to-Device (D2D) User Equipment (UE), the communication node comprising:
a first forming unit, configured to form auxiliary information, wherein the auxiliary information is used for access of the first D2D UE to a second access node, and the first access node and the second access node are access nodes of different types; and
a second sending unit, configured to send the auxiliary information to the first D2D UE, wherein the first access node is a first base station, and the second access node is a relay node located in a first cell, and the relay node is a second D2D UE, wherein the auxiliary information comprises a relay node discovery trigger threshold value, wherein the relay node discovery trigger threshold value is used for triggering the first D2D UE to discover a relay node available for access of the first D2D UE, wherein
the communication node is a first base station;
the second sending unit is further configured to send bearer control information to the first D2D UE; and
the bearer control information is used for providing basis for switching the first D2D UE to the second access node for communication data transmission.

* * * * *